June 10, 1924.
S. J. FULLER
1,497,559
APPLIANCE FOR CARRYING SPARE TIRES, RIMS, OR WHEELS UPON MOTOR VEHICLES
Filed May 8, 1922
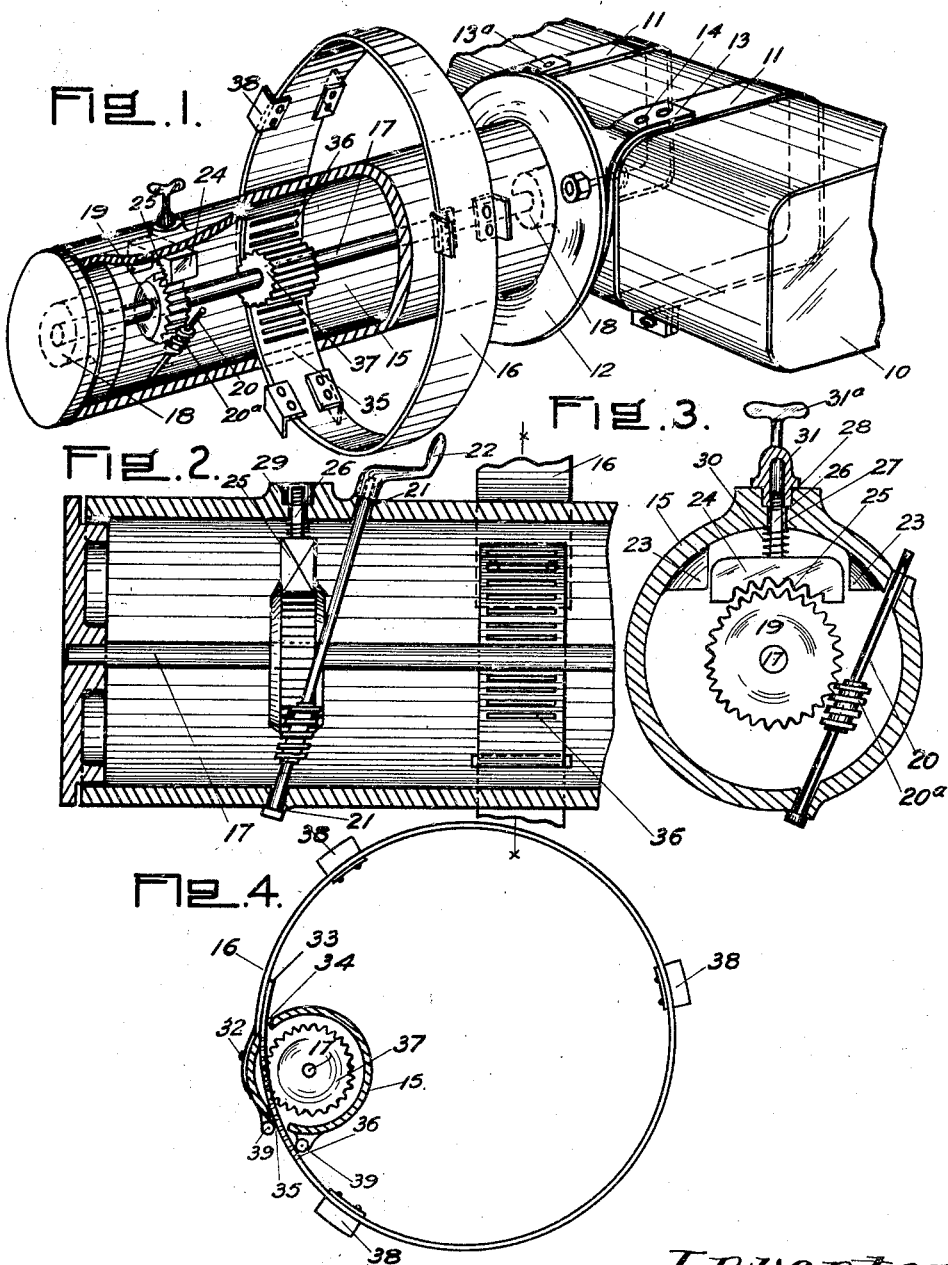
Inventor
S. J. Fuller,
By Marks&Clerk
Attys.

Patented June 10, 1924.

1,497,559

UNITED STATES PATENT OFFICE.

SAMUEL JOHN FULLER, OF PENRITH, NEW SOUTH WALES, AUSTRALIA.

APPLIANCE FOR CARRYING SPARE TIRES, RIMS, OR WHEELS UPON MOTOR VEHICLES.

Application filed May 8, 1922. Serial No. 559,382.

*To all whom it may concern:*

Be it known that I, SAMUEL JOHN FULLER, subject of the King of Great Britain and Ireland, residing at Riverdene, High Street, Penrith, in the State of New South Wales, Commonwealth of Australia, have invented new and useful Improvements in an Appliance for Carrying Spare Tires, Rims, or Wheels upon Motor Vehicles, of which the following is a specification.

Various methods and appliances are at present adopted for the purpose of carrying spare tires, rims or wheels on motor vehicles, but these methods or appliances mostly fail to provide a means, except of a most crude nature, to prevent the unauthorized removal of the tire, rim or wheel.

The object of this invention is to provide a permanent mechanically operated spare tire, rim or wheel holder the special features of which are that (1) it is mechanically operated, (2) it is adjustable so as to adapt it to the size of tire, rim or wheel it is required to carry and (3) it is provided with means whereby it may be locked when the tire, rim or wheel has been placed in position.

It consists of a short tube permanently secured by any suitable means to a convenient part of the chassis or the body of the vehicle. Mounted in bearings carried by the short tube, and axially within it, is a shaft upon which are keyed two spur wheels, one of which is operated by a worm carried on a transverse shaft that is operated by a handle, the other being adapted to engage with and operate an expanding metal band. This expanding band consists of a strip of suitable metal, of any required dimensions, one end of which is rigidly secured to the outer surface of the tube adjacent to the second spur wheel in such a manner that when it is bent to approximately a circular formation its axis will lie parallel to the axis of the tube. Adjacent to the point where the band is fixed to the tube, two longitudinal slots are cut in the tube, one above and the other below the fixed end of the band. The free end of the band is provided with transverse slots adapted to engage with the teeth on the second spur wheel, when the band is bent round and passed upwardly through the longitudinal slots in the tube, in order to increase or diminish the diameter of the band when the operating shaft is rotated by the handle and worm upon the transverse shaft.

Within the tube is a block having a segmental gear cut upon one of its faces, such segmental gear being adapted to engage with the teeth of the first spur wheel. The teeth upon this block are normally held in engagement with the teeth upon the spur wheel by means of a spring interposed between the block and the inner face of the tube. For the purpose of releasing the block from engagement with the spur wheel the block is provided with a threaded stud that passes through the wall of the tube into a recess in a boss formed upon the tube. A barrel key with a butterfly bow adapted to fit into the recess and to engage with the screw thread upon the stud is then used for the purpose of drawing the block radially outward against the action of its spring until the teeth upon the block and the spur wheel are disengaged. When this is done the operating shaft is free to be moved by the handle which may then be turned so as to decrease the diameter of the band sufficiently to allow the tire or rim to be passed over outwardly projecting or radial side lugs upon the band. The tire or rim having been placed in position upon the band the handle will again be turned, in the opposite direction so as to expand the band until it makes a tight fit within the tire or rim. The barrel key may then be unscrewed so as to release the pin and allow the spring to force the block into engagement with its spur wheel thus locking the operating shaft and preventing movement in either direction.

A modified arrangement would be necessary to adapt the appliance to carry a wheel or wheels, inasmuch as instead of being secured upon the exterior of the carrying band as in the case of tires or rims the wheel would be carried within the band. This would necessitate the fixture to which the band is secured being positioned outside the band instead of inside, and the radial lugs would in this case project inwardly instead of outwardly as with tires or rims. The rearrangement necessary, is however so obvious that it has been considered sufficient to illustrate the construction of an appliance adapted to be used for securing tires or rims.

My invention is not confined to the particular means described for locking the appliance, other locking devices may be used with equal efficiency without departing from the principle.

In order to more clearly describe the invention a detailed description will now be given and reference made to the various parts illustrated in the accompanying drawings in which:—

Fig. 1 is a perspective view, partly in section showing the appliance secured to a transverse rod or bar at the rear of a motor vehicle.

Fig. 2 is a sectional side elevation with a spur wheel removed in order to expose a greater portion of the slotted end of the expanding band.

Fig. 3 is a sectional end elevation.

Fig. 4 is a section on the line X of Fig. 2.

By referring to Fig. 1 it will be seen that the appliance is shown supported by a rod or bar 10 representing a transverse bar at the rear of a vehicle, by means of metal straps 11. A flange 12 is provided with extension pieces or arms 13, 13ª that are riveted or otherwise rigidly secured to the metal straps 11 at 14. The flange 12 may be integral with or suitably secured to the metal tube 15 which carries the operating and locking mechanism and the expanding metal band 16. Axially within the tube 15 is a shaft 17 that is mounted in bearings 18 at each end of the tube. Upon the shaft 17 is keyed a spur wheel 19 adapted to engage with a worm 20ª upon a short transverse shaft 20 suitably secured in bearings 21 formed in the wall of the tube 15. This shaft 20 is provided with a handle 22 to afford a means whereby the shaft 17 may be rotated.

Formed upon the inner face of the tube 15 adjacent to the spur wheel 19 are two guides 23 between which a block 24 is positioned and may freely slide up and down. This block 24 is provided with a segmental gear 25 cut upon its underneath face and adapted to engage with the teeth of the spur wheel 19. It is also provided with a stud 26 which projects through a hole 27, cut in the wall of the tube 15, and thence into a recess 28 in a boss 29 formed upon the exterior face of the tube. Surrounding the stud 26 and normally held in compression between the inner face of the tube 15 and the upper face of the block 24 is a coil spring 30 the function of which is to keep the segmental gear on the block 24 normally in engagement with the teeth upon the spur wheel 19 and thus prevent the rotation of the shaft 17. In order to raise the block 24 so as to release the segmental gear 25 from the spur wheel 19, a barrel key 31 adapted to fit into the recess 28 is provided. This barrel key has an internal thread that will engage with the thread upon the stud 26 and is provided with a butterfly bow 31ª by means of which it may be rotated. In operation the key is placed upon the stud 26 and rotated. The male thread of the stud engaging with the female thread of the key will draw the barrel of the key into the recess 28 until the end of the key abuts against the bottom of the recess. The continued rotation of the key will cause the stud 26 to be drawn into the barrel of the key against the action of the spring 30 thus raising the block 24 and freeing the segmental gear 25 from the spur wheel 19.

At a suitable point 32 upon the tube 15 is rigidly secured one end of a metal band 16 adapted to be bent to a circular or approximately a circular formation. Above and below the point where the band 16 is secured to the tube 15 two longitudinal slots 34 and 35 respectively are cut in the tube. These slots 34 and 35 enable the free end 33 of the band 16, when bent to an approximately circular formation, to pass through the wall of the tube 15 and to lie adjacent to and within the fixed end as is clearly shown at Fig. 4. The free end 33 of the band is provided with slots 36 with which the teeth of a spur wheel 37, rigidly secured to the shaft 17, will engage for the purpose of drawing the end of the band in or forcing it out so as to decrease or increase the circumferential measurement thereof. The band 16 may be of any required length according to the size of tires or rims it is to carry and may also be made of a width sufficient to accommodate one or several tires or rims. In order to prevent the removal of the tires or rims from the band when they have been placed in position and the band 16 expanded to the full extent of the inner diameter of the tire or rim, two or more angle pieces 38 will be rigidly secured to the band at or near each edge thereof thus forming radial projections from the band.

These radial projections 38 may if so desired be slidably secured to the band 16 so that in case a wide band is installed the projections may be moved inwardly, in a direction parallel with the main shaft 17, so as to enable a single tire or rim to be clamped if necessary, between the sets of projections on each side of the band 16.

If necessary small antifriction rollers 39 may be suitably attached longitudinally to the tube 15 at the entrance of the slot 35.

To operate the appliance the key 31 is screwed into the recess 28 and the block 24 raised as previously explained. The handle 22 may then be turned so as to rotate the shaft 17 in a direction that will draw the free end of the band 16 inwardly, thus decreasing its diameter sufficiently to enable the tire or rim to be slipped over the radial projections 38 on the outer edge of the band. The rim or tire will then lie so as to encircle the band 33 between the two sets of radial projections 38. The handle 22 will then be rotated in the opposite direction so as to expand the band 16 until it makes a tight fit within the inner periphery of the tire or rim. The key 31 may now be unscrewed and removed which will allow the spring 30 to force the teeth of the block 24 into engagement with the spur wheel 19 thus locking the whole appliance and preventing the removal of the tires, rims or wheels from the band 16.

I claim:—

1. An appliance for holding or carrying spare tires, rims or wheels upon motor vehicles, including a split metal band, a hollow fixture adapted to be connected to a motor vehicle and fixedly connected to one end of said band, means within said hollow fixture for increasing or diminishing the circumferential measurement of said band, operating means arranged exteriorly of said fixture for actuating the last mentioned means, and means for locking said first mentioned means in various adjusted positions.

2. The combination with a motor vehicle frame element, of a hollow fixture connected to said element, a split metal band having one of its ends connected to the fixture and its other end extending through said fixture, means within the fixture for actuating the last mentioned end to expand or contract said band, means extending to the exterior of the fixture to permit the operator to actuate the last mentioned means, and key operated mechanism for locking the first mentioned means in adjusted positions, said band being provided with elements to engage a tire rim or the like.

3. An appliance for holding or carrying spare tires, rims or wheels upon motor vehicles characterized by a metal band adapted to be bent into a circular or approximately circular formation having one end rigidly secured to a tube securely fastened to and projecting from any suitable part of the chassis or body of the vehicle, longitudinal slots in the wall of the tube, such slots being so positioned that the metal band may be bent to a circular, or approximately a circular formation and the free end passed through the longitudinal slots in the tube so as to lie adjacent to and correspond with side edges of the fixed end, a shaft suitably journalled within the tube, a spur wheel rigidly secured to the shaft, slots in the free end of the metal band adapted to engage with the teeth upon the spur wheel and means for rotating the shaft for the purposes specified.

4. An appliance for holding or carrying spare tires, rims or wheels upon motor vehicles characterized by a metal band adapted to be bent into a circular or approximately a circular formation having one end rigidly secured to a tube securely fastened to and projecting from any suitable part of the chassis or body of the vehicle, longitudinal slots in the wall of the tube, a shaft suitably journalled within the tube, a spur wheel rigidly secured to the shaft, slots in the free end of the metal band adapted to engage with the teeth upon the spur wheel, guides formed within the tube, a block adapted to slide between the guides, such block having a segmental gear cut upon one of its faces and being adapted to engage with the teeth of a second spur wheel rigidly secure to the shaft, a spring interposed between the inner face of the tube and a face of the block to normally keep the block in engagement with the second spur wheel, a removable key adapted to lift the block against the action of its spring and means for rotating the shaft for the purposes specified.

In testimony whereof, I have signed my name to this specification.

SAMUEL JOHN FULLER.